(12) United States Patent
Yin et al.

(10) Patent No.: US 12,547,874 B2
(45) Date of Patent: Feb. 10, 2026

(54) DEPLOYING PARALLELIZABLE DEEP LEARNING MODELS BY ADAPTING TO THE COMPUTING DEVICES

(71) Applicant: International Business Machines Corporation, Armonk, NY (US)

(72) Inventors: Kun Yan Yin, Ningbo (CN); Chao Yu, Ningbo (CN); Ming Jin Chen, Zhe Jiang (CN); Teng Sun, Beijing (CN); Xiao Ye Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 17/245,541

(22) Filed: Apr. 30, 2021

(65) Prior Publication Data
US 2022/0351020 A1    Nov. 3, 2022

(51) Int. Cl.
*G06N 20/00*    (2019.01)
*G06N 3/044*    (2023.01)

(52) U.S. Cl.
CPC ................... *G06N 3/044* (2023.01)

(58) Field of Classification Search
CPC ...... G06N 3/044; G06N 3/098; G06N 3/0442; G06N 3/0464
USPC ........................................................... 706/30
See application file for complete search history.

(56) References Cited

U.S. PATENT DOCUMENTS

| | | |
|---|---|---|
| 8,832,368 B1 | 9/2014 | Coatney et al. |
| 2010/0246662 A1 | 9/2010 | Koto |
| 2017/0220949 A1 | 8/2017 | Feng |
| 2019/0266015 A1 | 8/2019 | Chandra |
| 2019/0377625 A1* | 12/2019 | Chintalapati ............ G06N 7/01 |
| 2019/0378016 A1 | 12/2019 | John et al. |
| 2020/0050766 A1* | 2/2020 | Bos ........................ G06F 21/577 |
| 2020/0175361 A1 | 6/2020 | Che |

(Continued)

FOREIGN PATENT DOCUMENTS

| | | |
|---|---|---|
| CN | 108804974 A | 11/2018 |
| CN | 109947567 A | 6/2019 |

(Continued)

OTHER PUBLICATIONS

Lai, Liangzhen, and Naveen Suda. "Rethinking machine learning development and deployment for edge devices." arXiv preprint arXiv:1806.07846 (2018) (Year: 2018).*

(Continued)

*Primary Examiner* — Andrew T McIntosh
(74) *Attorney, Agent, or Firm* — Robert D. Bean

(57) ABSTRACT

In an approach to deploying parallelizable deep learning models by adapting to the computing devices, a deep learning model is split into a plurality of slices, where each slice can exchange data with related slices. Virtual models are created from the plurality of slices, where the virtual models are based on capabilities of a plurality of devices on which the one or more virtual models are to be deployed, and further where each virtual model contains each slice of the plurality of slices. The one or more virtual models are stored in a cache. Responsive to determining that the deep learning model is to be deployed on one or more devices, a candidate model is selected from the virtual models in the cache, where the selection is based on information from a device monitor about the devices.

20 Claims, 6 Drawing Sheets

(56) References Cited

U.S. PATENT DOCUMENTS

| | | | | |
|---|---|---|---|---|
| 2020/0210834 | A1 | 7/2020 | D'Ercoli | |
| 2020/0272896 | A1* | 8/2020 | Wei | G06N 3/08 |
| 2021/0034960 | A1* | 2/2021 | Khapali | G06N 3/08 |
| 2021/0208983 | A1* | 7/2021 | Lin | G06F 11/142 |
| 2021/0350180 | A1* | 11/2021 | Oleson | G06V 10/945 |
| 2022/0206865 | A1* | 6/2022 | Voruganti | G06N 20/00 |
| 2022/0292361 | A1* | 9/2022 | Wang | G06N 3/0495 |
| 2023/0244953 | A1* | 8/2023 | Park | G06N 3/098 |
| | | | | 706/15 |

FOREIGN PATENT DOCUMENTS

| | | |
|---|---|---|
| CN | 110580197 A | 12/2019 |
| CN | 110866610 A | 3/2020 |
| CN | 111953751 A | 11/2020 |
| CN | 112115830 A | 12/2020 |
| CN | 117242459 A | 12/2023 |
| JP | 2018-206199 A | 12/2018 |
| JP | 2024-516520 A | 4/2024 |
| WO | 2022/227798 A1 | 11/2022 |

OTHER PUBLICATIONS

Chen, Jiasi, and Xukan Ran. "Deep learning with edge computing: A review." Proceedings of the IEEE 107.8 (2019): 1655-1674 (Year: 2019).*

Aral, Atakan, and Ivona Brandić. "Learning spatiotemporal failure dependencies for resilient edge computing services." IEEE Transactions on Parallel and Distributed Systems 32.7 (2020): 1578-1590 (Year: 2020).*

Denneman, F. "Multi-GPU and Distributed Deep Learning", Feb. 19, 2020, 9 pps., <https://frankdenneman.hl/2020/02/19/multi-gpu-and-distributed-deep-learning/>.

Matsubara, et al, "Distilled Split Deep Neural Networks for Edge-Assisted Real-Time Systems", Hot Edge Video, Oct. 21, 2019, 6 pps., Los Cabos, Mexico, <https://dl.acm.org/doi/pdf/10.1145/3349614.3356022>.

"Notification of Transmittal of the International Search Report and the Written Op Inion of the International Searching Authority, or the Declaration", From the International Searching Authority, Applicant's or agent's file reference: IEE220164PCT, International application No. PCT/CN2022/076419, International filing date: Feb. 16, 2022, Date of Mailing: May 13, 2022, 9 pgs.

Dean, et al., "Large Scale Distributed Deep Networks", Advances in Neural Information Processing Systems, ResearchGate, Oct. 2012, 10 pgs.

Jia, et al., "Beyond Data and Model Parallelism for Deep Neural Networks", arXiv: 1807.05358v1 [cs.DC], Jul. 14, 2018, 15 pgs.

Kim, et al., "SplitNet: Learning to Semantically Split Deep Networks for Parameter Reduction and Model Parallelization", Proceedings of the 34th International Conference on Machine Learning, Sydney, Australia, PMLR 70, 2017, 9 pgs.

The State Intellectual Property Office of People's Republic of China, "First Office Action", Aug. 27, 2025, 22 Pages, CN Application No. 202280027420.1.

Japan Patent Office, "Notice of Reasons for Refusal" Jul. 1, 2025, 06 Pages, JP Application No. 2023-560354.

Zeng et al., "CoEdge: Cooperative DNN Inference with Adaptive Workload Partitioning over Heterogeneous Edge Devices", arXiv, Dec. 6, 2020, 14 pages, doi: https://doi.org/10.48550/arXiv.2012.03257.

* cited by examiner

DEPLOYING PARALLELIZABLE DEEP LEARNING MODELS BY ADAPTING TO THE COMPUTING DEVICES

BACKGROUND

The present invention relates generally to the field of machine learning, and more particularly to deploying parallelizable deep learning models by adapting to the computing devices.

Machine learning (ML) is an application of artificial intelligence (AI) that provides systems the ability to automatically learn and improve from experience without being explicitly programmed. Machine learning is the use and development of computer systems that are able to learn and adapt without following explicit instructions, by using algorithms and statistical models to analyze and draw inferences from patterns in data. Machine learning algorithms build a model based on sample data, known as "training data", in order to make predictions or decisions. Machine learning algorithms are used in a wide variety of applications, such as email filtering and computer vision, where it is difficult or unfeasible to develop conventional algorithms to perform the needed tasks.

Deep learning is an artificial intelligence (AI) function that imitates the workings of the human brain in processing data and creating patterns for use in decision making. Deep learning is a subset of machine learning in artificial intelligence that has networks capable of learning from data that is unstructured or unlabeled. Deep learning is a class of machine learning algorithms that uses multiple layers in the network to progressively extract higher-level features from the raw input. For example, in image processing lower layers may identify edges, while higher layers may use those edges to discern entire objects. Most modern deep learning models are based on artificial neural networks, specifically convolutional neural networks (CNNs). Deep learning is experiencing explosive growth because of the intersection of deeply layered neural networks and the use of graphical processing units (GPUs) to accelerate their execution.

In order to improve the model accuracy, data scientists tend to build the neural network deeper and deeper. As the neural network complexity increases however, the size of the model becomes quite large, significantly increasing the time it takes to transfer and deploy the model. The initialization and running of the model consumes a great deal of processor and memory capacity, and the trained model is difficult to relocate and balance for high availability (HA).

In order to deploy a model at edge devices there are different methods to compress the model. Model compression can be divided into two broad categories. The first category is pruning, which entails removing redundant connections present in the architecture. The problem with pruning is that the new model formed will have lower accuracy than the original model since the model was actually trained for the original connections. The second category is quantization, which involves bundling weights together by clustering them or rounding them off so that the same number of connections can be represented using lesser amount of memory. Like pruning, however, quantization reduces the accuracy of the model. As a result, often an edge device only owns a single, non-robust model. The problem with the present art is that there is no method to deploy a large model with high accuracy, high availability and extensibility without compression.

SUMMARY

Embodiments of the present invention disclose a computer-implemented method, a computer program product, and a system for deploying parallelizable deep learning models by adapting to the computing devices. In one embodiment, a deep learning model is split into a plurality of slices, where each slice can exchange data with related slices. Virtual models are created from the plurality of slices, where the virtual models are based on capabilities of a plurality of devices on which the one or more virtual models are to be deployed, and further where each virtual model contains each slice of the plurality of slices. The one or more virtual models are stored in a cache. Responsive to determining that the deep learning model is to be deployed on one or more devices, a candidate model is selected from the virtual models in the cache, where the selection is based on information from a device monitor about the devices. Embodiments of the present invention split the model into slices based on the capabilities of the edge computing devices and select a candidate model and model slices from a virtual model cache to compose a whole model based on the capabilities of the edge computing devices.

In one embodiment, the deep learning model is split into a plurality of slices, where each slice is a different network layer of a plurality of different network layers of the deep learning model. Embodiments of the present invention split the model into slices to deploy on a plurality of edge devices.

In one embodiment, responsive to determining that the deep learning model is not easily parallelizable, the deep learning model is split into a plurality of slices based on a set of predetermined rules, where the set of predetermined rules split the deep learning model into a plurality of smallest parallelizable layers. Embodiments of the present invention split the model into slices to deploy on a plurality of edge devices.

In one embodiment, information is collected by the device monitor from the plurality of devices on which the deep learning model can be deployed. Features of the plurality of devices are encoded per time slice, where the features include at least one of, but are not limited to, central processing unit (CPU) capacity, graphical processing unit (GPU) capacity; and disk capacity, and further where the time slice is a predetermined period of time. A risk factor is predicted for each device of the plurality of devices, wherein the risk factor is predicted using a long short-term memory (LSTM) model. Responsive to determining that the risk factor for any device of the plurality of devices exceeds a predetermined threshold, the top n devices are selected, where n is a predetermined number, and further where the top n devices have the lowest risk factor. Responsive to selecting the top n devices of the plurality of devices, new virtual models are created from the slices, where the new virtual models are based on the capabilities of the top n devices of the plurality of devices. The cache is updated with the new virtual models. Embodiments of the present invention monitor the health of devices on which the models are deployed and creates new virtual models for new devices.

In one embodiment, the health of each device of the plurality of devices is monitored. Responsive to determining that the health of any device is below a predetermined threshold, the device is marked as a failed device. The failed device is removed from the plurality of devices. A new virtual model is created, where the new virtual model does not include the failed device. The new virtual model is deployed to the one or more devices of the plurality of devices. The cache is updated with the new virtual model. Embodiments of the present invention monitor the health of devices on which the models are deployed and replaces high risk or unhealthy devices with other healthy devices.

In one embodiment, the one or more virtual models are confirmed to match the deep learning model, where confirming that the one or more virtual models match the deep learning model is determined by one or more predetermined validation rules. Embodiments of the present invention use validation rules to confirm the models are operating properly on the edge devices.

DETAILED DESCRIPTION

Figure 1:
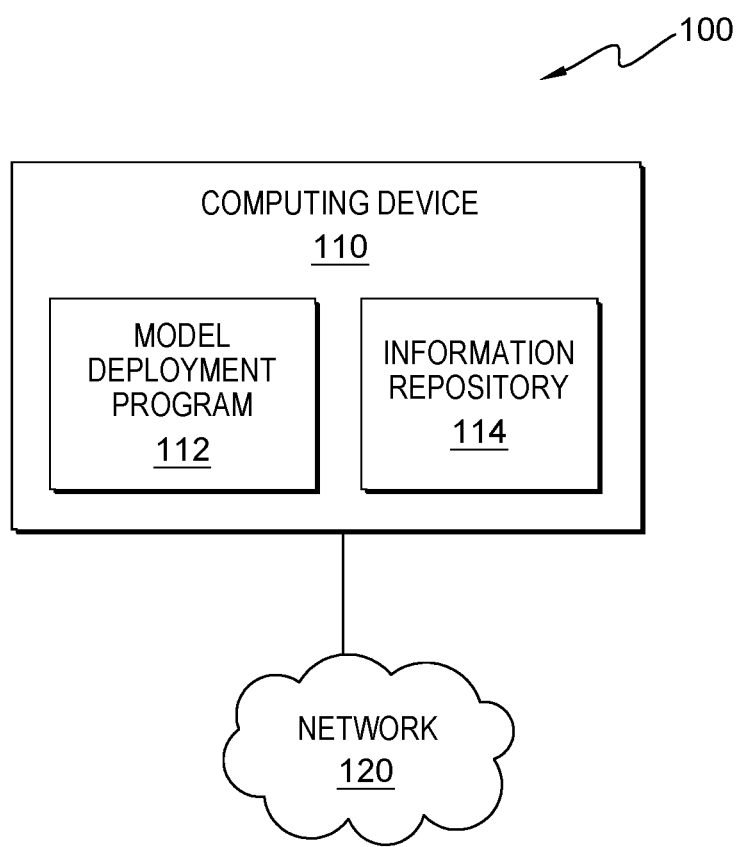
FIG. 1 is a functional block diagram illustrating a distributed data processing environment, in accordance with an embodiment of the present invention.

Most deep learning models are easily separable since the deep learning model is constructed of different layers with parameters. Edge devices have different resource capabilities; some devices are more powerful than other devices, with different network connectivity.

To solve the problem with the present art, that there is no method to deploy a large model with high accuracy, high availability and extensibility without compression, the present invention provides a computer-implemented method, computer program product, and system to split the model based on different devices and virtual models. Based on the deployment, the present invention will monitor and manage the model units during the runtime, to ensure the model runtime is stable and flexible. To accomplish this, in some embodiments the present invention includes three components, the model splitter engine, the virtual model cache, and the device monitor.

In an embodiment, the model splitter engine splits the model based on the capabilities of the edge computing device. The model splitter engine may create many different splits of the model to accommodate different edge devices with different capabilities. The virtual model cache selects a candidate model and model slices from the virtual model cache to compose a whole model based on the capabilities of the edge computing device or devices. The device monitor monitors the health of the devices and reports the information to the virtual cache to keep the cache updated.

In an embodiment, the present invention cuts the model into different network layers, where one specific network layer can exchange data with related layers. Based on different edge devices capabilities, e.g., central processing unit/graphics processing unit (CPU/GPU) capabilities and memory, the present invention dynamically deploys network layers to the most compatible edge devices. For example, the edge devices with higher capabilities will run more computing, while the edge devices with lower capabilities will run less computing.

In an embodiment, the model splitter engine works as follows. First, the model is split into different slices by a slices generator. For networks which are parallelizable, e.g., CNN, the slices generator splits the slices by layers. For some complex networks which are hard to parallelize, the slices generator uses rules to split network into the smallest parallelizable layers. To deploy the model to the edge devices, the slices generator performs a search to match resources. Based on monitor information, the slices generator computes the size and capability of the edge devices, determines the best match among available edge devices, and distributes slices based on the resources of the matching devices. In addition, the slices generator uses validation rules to confirm the models are operating properly on the edge devices.

In an embodiment, the virtual model cache keeps virtual models for inference and will also give order using a cognitive model selector. The virtual model cache includes two key components: the cache model list, which is a file that records the top n composed optimal models; and the cognitive model generator, which checks the health of the top n devices running the model. In an embodiment, if the virtual model cache detects any abnormality in the running model, then the virtual model cache will select a new model and deploy the new model to the appropriate edge devices.

In an embodiment, the monitor will collect the health of the devices for scheduling and will also include the device resources such GPU, disk, and memory. In an embodiment, the monitor includes scripts which collect the information from the devices according to a schedule and sends this information to virtual model cache. In an embodiment, the monitor may be opensource tools.

FIG. 1 is a functional block diagram illustrating a distributed data processing environment, generally designated 100, suitable for operation of model deployment program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes model deployment program 112. In an embodiment, model deployment program 112 is a program, application, or subprogram of a larger program for deploying parallelizable deep learning models by adapting to the computing devices. In an alternative embodiment, model deployment program 112 may be located on any other device accessible by computing device 110 via network 120.

In an embodiment, computing device 110 includes information repository 114. In an embodiment, information repository 114 may be managed by model deployment program 112. In an alternate embodiment, information repository 114 may be managed by the operating system of the device, alone, or together with, model deployment program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, deep learning model data, Long Short-Term Memory (LSTM) data, device health data, model slice data, operating system data, configuration data, and other data that is received by model deployment program 112 from one or more sources, and data that is created by model deployment program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Figure 2:
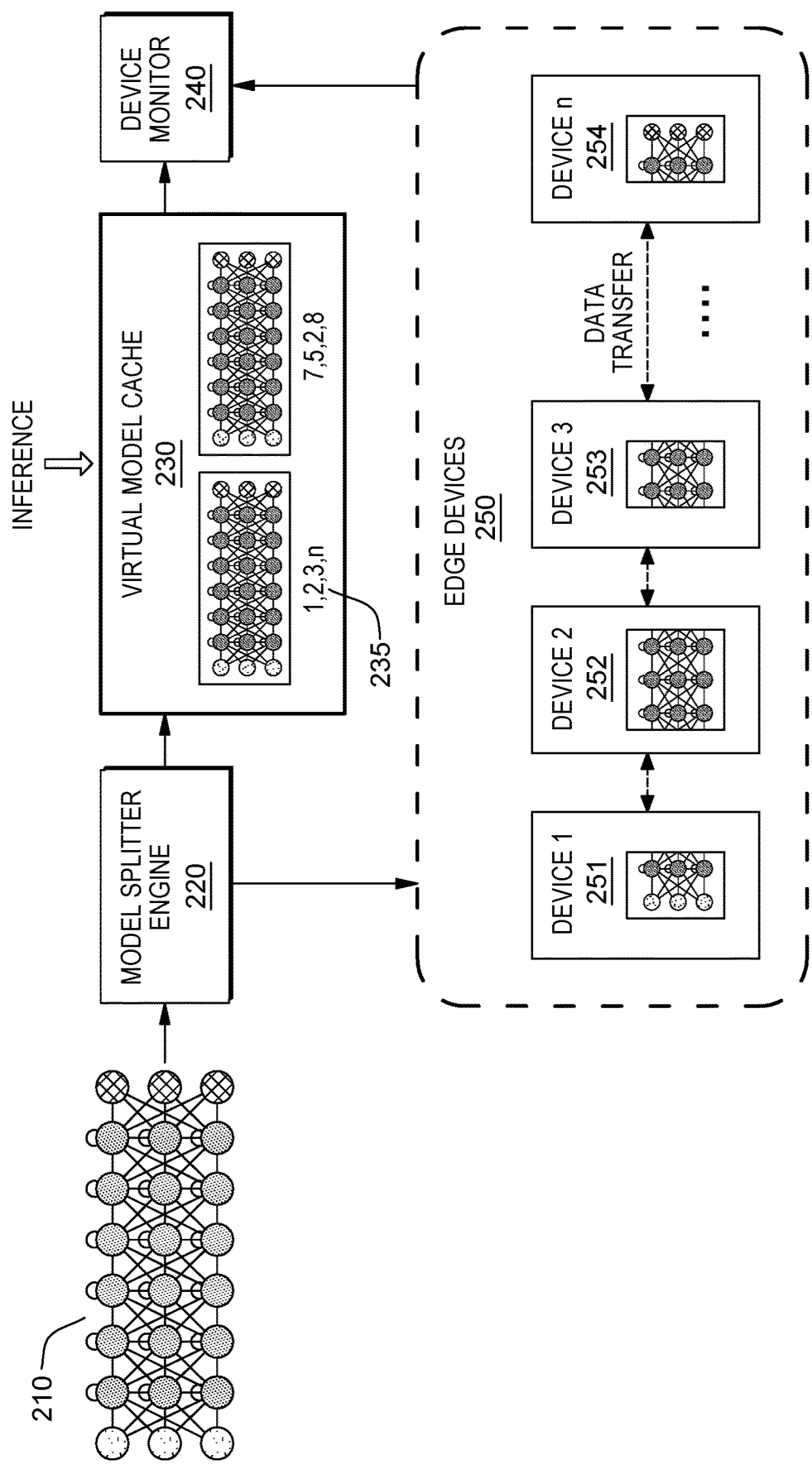
FIG. 2 is an example of splitting a deep learning model based on different devices and virtual models, in accordance with an embodiment of the present invention.

FIG. 2 is an example of splitting a deep learning model based on different devices and virtual models, in accordance with an embodiment of the present invention. In an embodiment, model deployment program 112 splits the model based on different devices and virtual models. In an embodiment, based on the deployment, model deployment program 112 monitors and manages the model during runtime to ensure the model is stable and flexible during the runtime. In this example, deep learning model 210 represents the deep learning model that will be split based on the capabilities of the computing devices on which it may be deployed.

In an embodiment, model deployment program 112 includes three major components. The first component is model splitter engine 220. This represents the section of model deployment program 112 that splits the model based on the capabilities of the edge computing devices on which it may be deployed. In an embodiment, the same deep learning model may have multiple different splits for deploying to different environments of edge devices. In an embodiment, model deployment program 112 will create one or more virtual models to deploy to different sets of edge devices.

The second component is virtual model cache 230. This represents the cache from which model deployment program 112 will select model slices to compose a whole model, or an existing virtual model, and then selects a candidate model for deployment. Virtual model cache 230 contains models 235. The final component is device monitor 240. This represents the section of model deployment program 112 that will monitor the health of the device and update the virtual cache with the device health information.

In the example of FIG. 2, edge devices 250 represent the edge devices on which model deployment program 112 will deploy slices of the model to allow efficient operation of the entire model. In this example, edge devices 250 includes device 1 251, device 2 252, device 3 253, and device n 254. When the slices are distributed to edge devices 250, each device has the capability to transfer data to related slices. In this way, the entire model is run without compression, by distributing the model slices between edge devices that can communicate with each other to run the original model.

Figure 3:
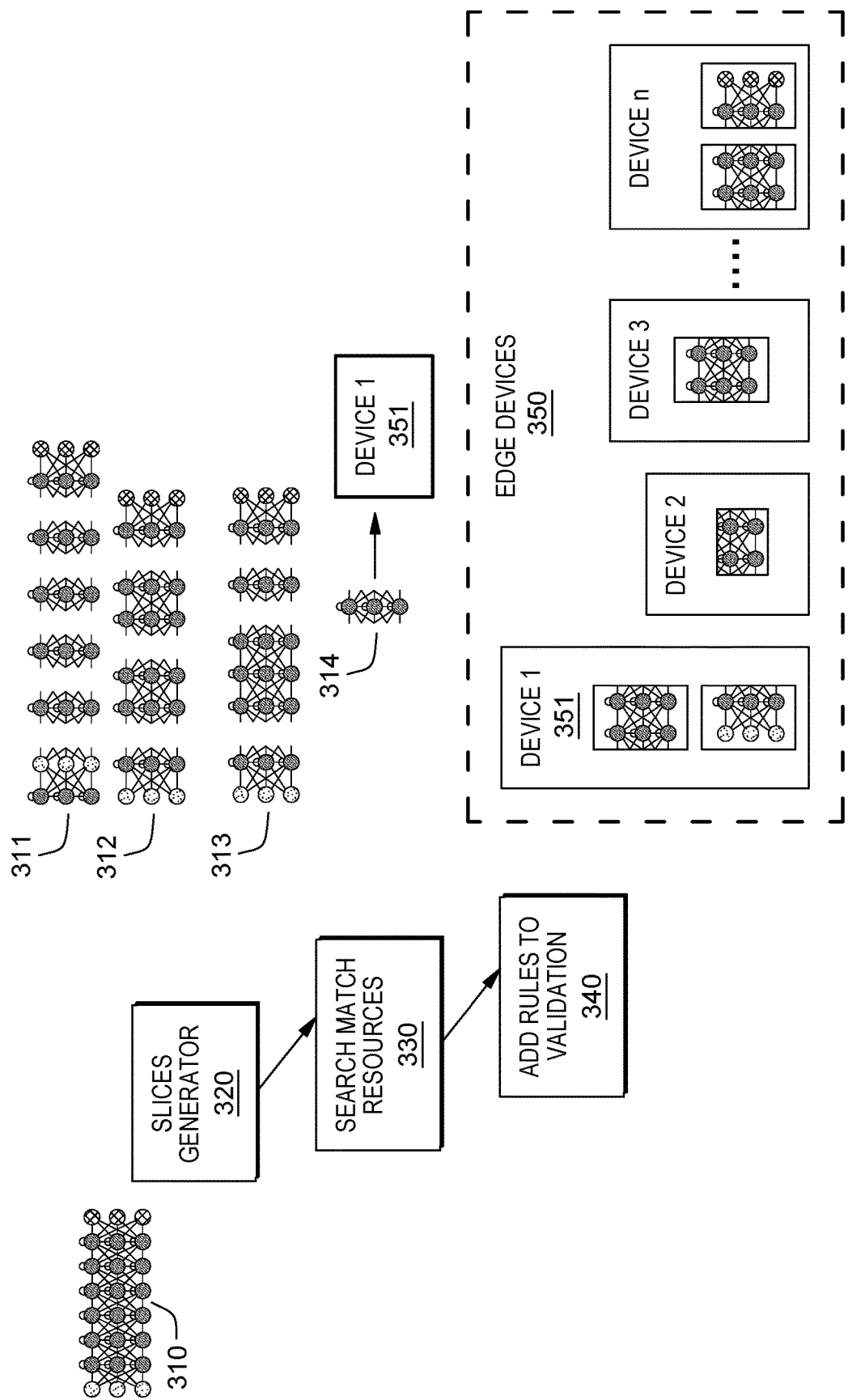
FIG. 3 is an example of the model splitting engine, in accordance with an embodiment of the present invention.

FIG. 3 is an example of the model splitting engine, in accordance with an embodiment of the present invention. In an embodiment, the neural network is cut into different network layers by the model splitting engine, and one specific network layer can exchange data with related layers. Based on different capabilities of edge devices, e.g., CPU/GPU and memory, model deployment program 112 may dynamically deploy network layers to the most compatible edge devices. For example, edge devices with higher capability will run slices requiring more computing capacity, while edge devices with lower capability will run slices requiring less computing capacity.

In the example of FIG. 3, deep learning model 310 represents deep learning model 210 from FIG. 2, slice 311, slice 312, slice 313, and slice 314 represent the slices of deep learning model 310 after splitting the model, and slices generator 320 represents the section of model deployment program 112 that splits the model based on the capabilities of the edge computing devices on which it may be deployed, e.g., model splitter engine 220 of FIG. 2. In the example of FIG. 3, slice 311, slice 312, and slice 313 represent three different virtual models of deep learning model 310, where each of slice 311, slice 312, and slice 313 are split on different boundaries to accommodate different edge devices of different capacities.

For networks which are parallelizable, such as a Convolutional Neural Network (CNN), model deployment program 112 will split the slices by layers. For some complex networks which are hard to parallelize, model deployment program 112 may add rules to split the network into the smallest parallelizable layers.

In an embodiment, the rules are specific for deep learning network types. For example, there are usually several network layers in a CNN, the computing result of the current layer will be used as the input for next layer, which allows the layers to be split. However, in a Recurrent Neural Network (RNN), the network layers will remember the last state of the input and therefore cannot be split directly. In an embodiment, for an RNN, in order to remember the last state of the input, a split layer will record its back or forward splice layer to build up a double linked layer network.

In an embodiment, search match resources 330 represents the section of model deployment program 112 that computes the size and capabilities of the edge devices based on information gathered by the monitor, e.g., device monitor 240 from FIG. 2. Model deployment program 112 then distributes slices based on the available resources of the matching devices. Add rules to validation 340 represents the section of model deployment program 112 that adds rules to confirm that the computing devices can properly run the models. For example, a rule may state that model deployment program 112 needs to allocate some capacity on a device for other tasks, and therefore the slice(s) deployed to that device may be adjusted.

In an embodiment, edge devices 350 represents edge devices 250 from FIG. 2. Edge devices 350 includes device 1 351, which represents device 1 251 from FIG. 2. In this example, slice 314 is deployed by model deployment program 112 to device 1 351 based on search match resources 330.

Figure 4:
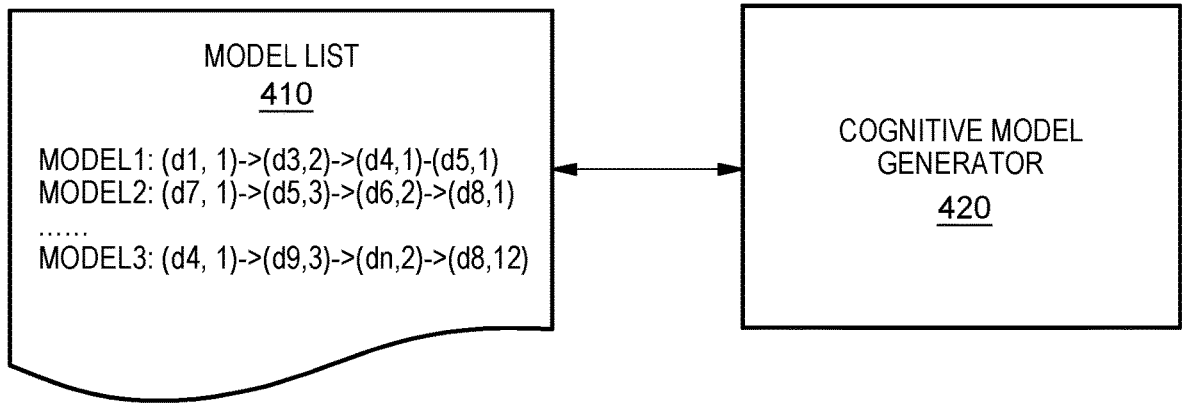
FIG. 4 is an example of the virtual model cache, in accordance with an embodiment of the present invention.

FIG. 4 is an example of the virtual model cache, in accordance with an embodiment of the present invention. In an embodiment, the virtual model cache will store virtual models for inference and may also organize the models using the cognitive model selector. This part will therefore include two key components, the model list and the cognitive model generator.

Model list 410 is a file in which model deployment program 112 records the top n composed optimal models, where n is a predetermined value, based on an analysis of the deep learning model. This is essentially a list of all the models stored in the model cache. In an embodiment, each line in the model list describes one virtual model, and the slices that make up that model. For example, Model1 will be split into four slices: s1, s2, s3, and s4. In the example of FIG. 4, s1 is deployed on device1 with slot 1, s2 is on device3 with slot 2, s3 is on device4 with slot 1, and s4 is on device5 with slot 1. The slot is used to find/locate the slice on a specific device.

In an embodiment, model deployment program 112 includes cognitive model generator 420, which is the section of model deployment program 112 that checks the health of the top n devices, where n is a predetermined value, for each model. If model deployment program 112 detects any abnormality in the health of the top n devices, then model deployment program 112 will select a new model to run on different devices. This is the section of model deployment program 112 that determines how to update the model cache.

Figure 5:
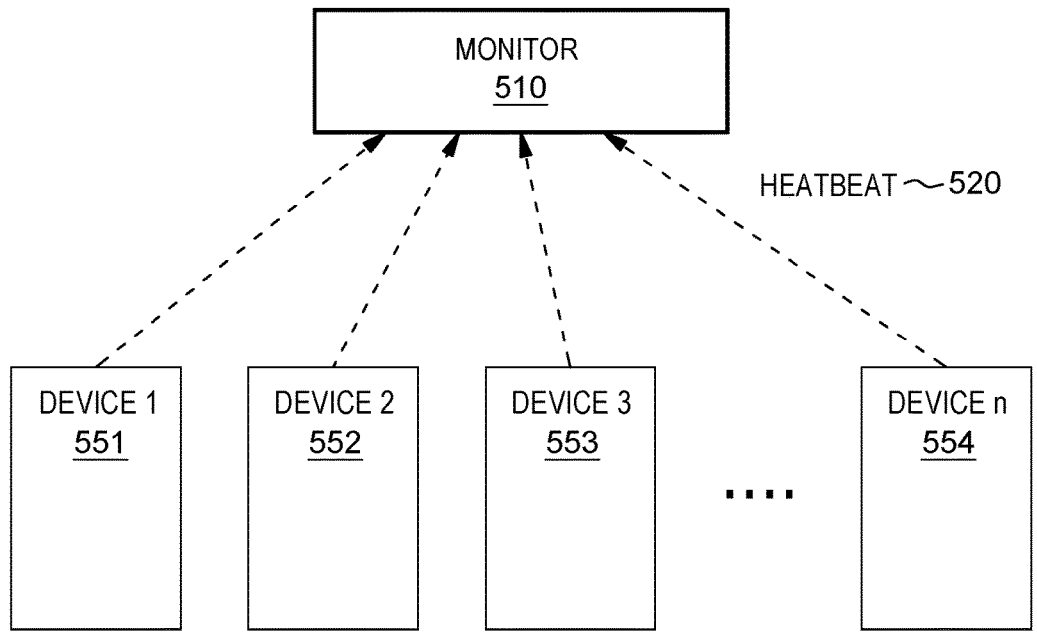
FIG. 5 is an example of the monitor, in accordance with an embodiment of the present invention.

FIG. 5 is an example of the monitor, in accordance with an embodiment of the present invention. In the example of FIG. 5, device monitor 510 represents the section of model deployment program 112 that will collect the health of the devices for scheduling the deployment of the models and also includes device resources such CPU/GPU, disk, and memory. This is an example of device monitor 240 from FIG. 2. In an embodiment, model deployment program 112 uses scripts which collects the information from the devices on a schedule and sends this information to the virtual model cache. In an embodiment, model deployment program 112 may use open-source device monitoring tools for the device monitor.

Device 1 551, device 2 552, device 3 553, and device n 554 represent the edge devices being monitored by device monitor 510 of model deployment program 112. Heartbeat 520 represents the collection of the information from the devices on a schedule by model deployment program 112.

Figure 6:
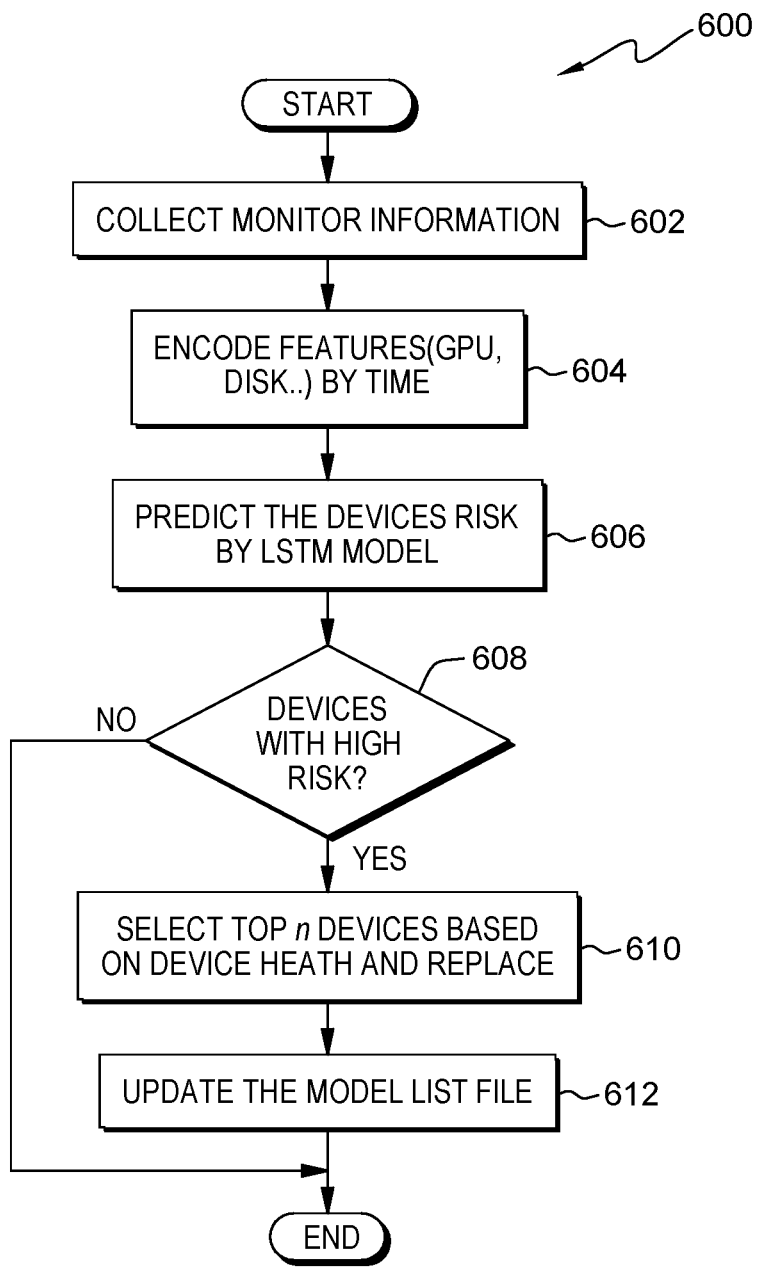
FIG. 6 is a flowchart depicting operational steps of the model generation procedure performed by model deployment program 112, on a computing device within the distributed data processing environment of FIG. 1, for deploying parallelizable deep learning models by adapting to the computing devices, in accordance with an embodiment of the present invention.

FIG. 6 is a flowchart depicting operational steps of the model generation procedure performed by model deployment program 112, on a computing device within the distributed data processing environment of FIG. 1, for deploying parallelizable deep learning models by adapting to the computing devices, in accordance with an embodiment of the present invention. In an alternative embodiment, the steps of workflow 600 may be performed by any other program while working with model deployment program 112.

In an embodiment, model deployment program 112 continuously collects data from the monitor to monitor the health of the devices running the deployed slices of the deep learning model, or that may be called into service to run slices of the deep learning model yet to be deployed. In an embodiment, model deployment program 112 encodes the features, e.g., GPU, disk speed and capacity, memory available, etc., by time to determine the capacity that each device has to run model slices. In an embodiment, model deployment program 112 uses an LSTM model to predict the risk of each device being monitored by the device monitor. In an embodiment, model deployment program 112 determines whether the device is a high risk for running the model. In an embodiment, model deployment program 112 selects the top n devices, where n is a predetermined number based on the evaluation of the device health by the monitor function of model deployment program 112 and replaces the high risk/failure device with a healthy device. In an embodiment, model deployment program 112 then updates the model list file with the new split of the model as determined in step 610. In an embodiment, model deployment program 112 then ends for this cycle.

It should be appreciated that embodiments of the present invention provide at least for deploying parallelizable deep learning models by adapting to the computing devices. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 is illustrates one possible iteration of the operational steps performed by model deployment program 112 for deploying parallelizable deep learning models by adapting to the computing devices, which repeats each time a deep learning model is to be deployed.

Model deployment program 112 collects monitor information (step 602). In an embodiment, model deployment program 112 continuously collects data from the monitor, e.g., device monitor 240 from FIG. 2, to monitor the health of the devices running the deployed slices of the deep learning model, or that may be called into service to run slices of the deep learning model yet to be deployed.

Model deployment program 112 encode features (GPU, disk, etc.) by time (step 604). In an embodiment, model deployment program 112 encodes the features, e.g., CPU capacity, GPU capacity, disk speed and capacity, memory available, etc., by time to determine the capacity that each device has to run model slices. In an embodiment, the time slice used by the monitor section of model deployment program 112 is a predetermined period of time. In another embodiment, the time slices used by the monitor section of model deployment program 112 are received from a user. In yet another embodiment, the time slices used by the monitor section of model deployment program 112 may be chosen by any other method that would be known by a person of skill in the art.

Model deployment program 112 predicts the device's risk by using an LSTM model (step 606). In an embodiment, model deployment program 112 uses an LSTM model to predict the risk of each device being monitored by the device monitor. In an embodiment, model deployment program 112 calculates a risk factor for the device using the LSTM model.

In an embodiment, model deployment program 112 uses the historical system monitoring data to train the LSTM model. In an embodiment, the encoded features may include, but are not limited to, GPU, memory, disk consumption, time series data, etc., and the labeled results are the health status of the device. In an embodiment, model deployment program 112 uses the LSTM to predict the health status or risk of the devices based on device resource consumption data.

Model deployment program 112 determines if there are devices with high risk (decision block 608). In an embodiment, model deployment program 112 determines whether the device is a high risk for running the model. In an embodiment, this is the risk that the model to be deployed cannot run on this device. In an embodiment, there is no risk when the device is healthy and has sufficient capacity to run the model. If a device has no risk, then the model does not need to be split. In an embodiment, if model deployment program 112 determines that the device is not a high risk for running the model ("no" branch, decision block 608), then model deployment program 112 deploys the model to the device. Model deployment program 112 then ends for this cycle. In an embodiment, if model deployment program 112 determines that the device is a high risk for running the model ("yes" branch, decision block 608), then model deployment program 112 proceeds to step 610 to split the model.

Model deployment program 112 selects the top n devices based on device health and replaces (step 610). In an embodiment, if model deployment program 112 determines that the risk factor for any device as determined in step 606 exceeds a predetermined threshold, then model deployment program 112 marks the device as a failed device. In an embodiment, model deployment program 112 then selects the top n devices, where n is a predetermined number based on the evaluation of the device health by the monitor function of model deployment program 112 and replaces the high risk/failure device with a healthy device. In an embodiment, model deployment program 112 determines the top n devices by selecting the devices that have the lowest risk factor. In an embodiment, model deployment program 112 removes the high risk/failed device from the list of available devices.

Model deployment program 112 updates the model list file (step 612). In an embodiment, model deployment program 112 then updates the model list file, e.g., model list 410 of FIG. 4, with the new split of the model as determined in step 610. In an embodiment, model deployment program 112 then ends for this cycle.

Figure 7:
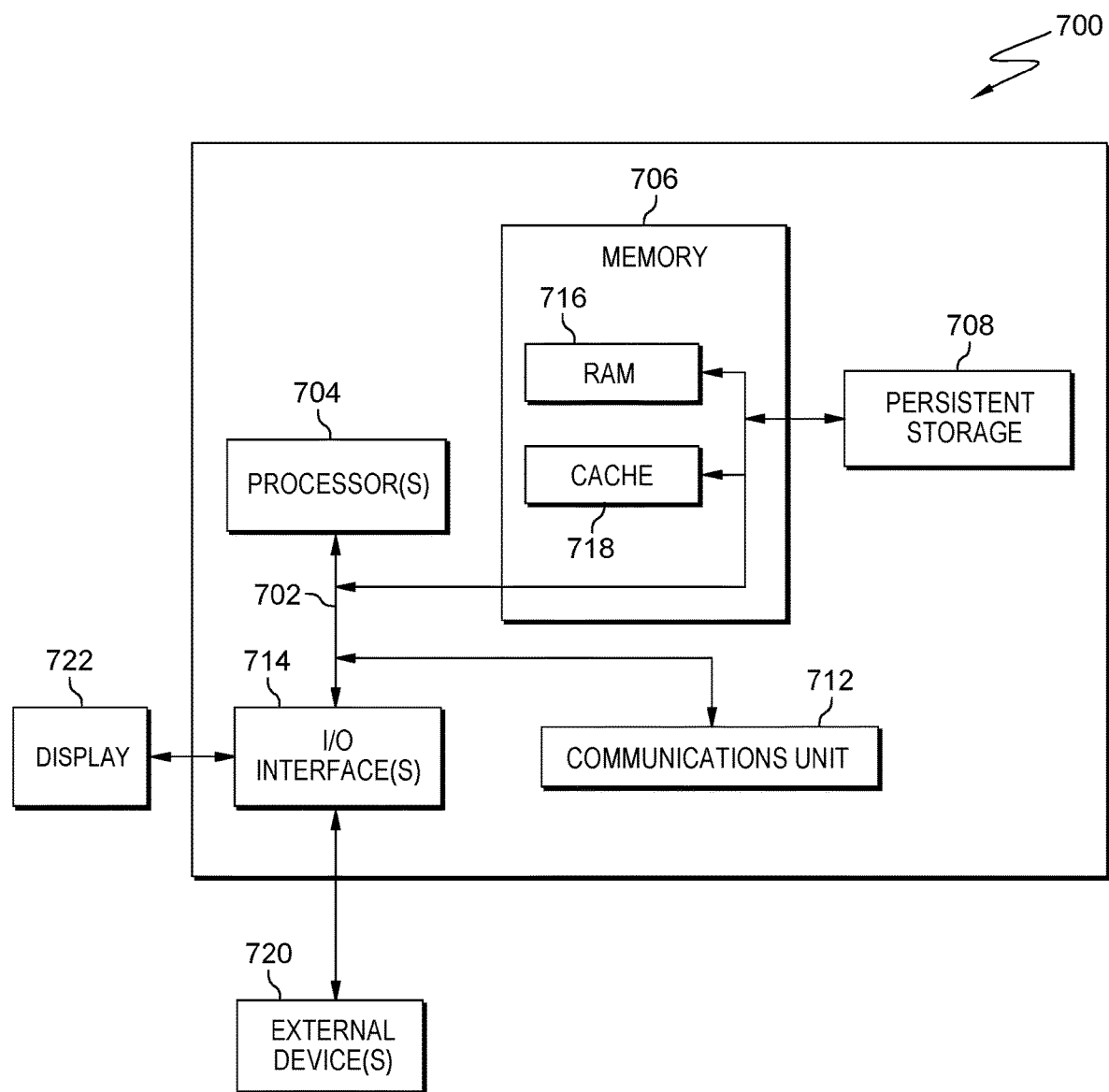
FIG. 7 depicts a block diagram of components of the computing devices executing the model deployment program within the distributed data processing environment of FIG. 1, in accordance with an embodiment of the present invention.

FIG. 7 is a block diagram depicting components of computing device 110 suitable for model deployment program 112, in accordance with at least one embodiment of the invention. FIG. 7 displays computer 700; one or more processor(s) 704 (including one or more computer processors); communications fabric 702; memory 706, including random-access memory (RAM) 716 and cache 718; persistent storage 708; communications unit 712; I/O interfaces 714; display 722; and external devices 720. It should be appreciated that FIG. 7 provides only an illustration of one embodiment and does not imply any limitations with regard to the environments in which different embodiments may be implemented. Many modifications to the depicted environment may be made.

As depicted, computer 700 operates over communications fabric 702, which provides communications between computer processor(s) 704, memory 706, persistent storage 708, communications unit 712, and I/O interface(s) 714. Communications fabric 702 may be implemented with any architecture suitable for passing data or control information between processors 704 (e.g., microprocessors, communications processors, and network processors), memory 706, external devices 720, and any other hardware components within a system. For example, communications fabric 702 may be implemented with one or more buses.

Memory 706 and persistent storage 708 are computer readable storage media. In the depicted embodiment, memory 706 comprises RAM 716 and cache 718. In general, memory 706 can include any suitable volatile or non-volatile computer readable storage media. Cache 718 is a fast memory that enhances the performance of processor(s) 704 by holding recently accessed data, and near recently accessed data, from RAM 716.

Program instructions for model deployment program 112 may be stored in persistent storage 708, or more generally, any computer readable storage media, for execution by one or more of the respective computer processors 704 via one or more memories of memory 706. Persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. In the context of some embodiments of the present invention, the source of the various input data may be physically remote to computer 700 such that the input data may be received, and the output similarly transmitted via communications unit 712.

I/O interface(s) 714 allows for input and output of data with other devices that may be connected to computer 700. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., model deployment program 112, can be stored on such portable computer readable storage media and can be loaded onto persistent storage 708 via I/O interface(s) 714. I/O interface(s) 714 also connect to display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   splitting, by one or more computer processors, a deep learning model comprising a recurrent neural network (RNN) into a plurality of slices, wherein each of the slices comprises at least one of a plurality of layers comprising the deep learning model, wherein each of the slices requires a computing capacity, and wherein each of the slices records its back or forward slice to remember a last state of an input and to build up a double linked layer network;
   collecting, by a device monitor, a plurality of device resources of a plurality of devices;
   monitoring a risk factor of the plurality of devices based on the device resources;
   selecting a plurality of top n devices from the devices, wherein the top n devices have a lowest risk factor;
   distributing, by a virtual model cache, the slices to the top n devices based on the computing capacity required by the slices and the device resources of the top n devices; and
   running the deep learning model on the top n devices.

2. The computer-implemented method of claim 1, wherein each slice of the plurality of slices comprises a different network layer of a plurality of different network layers of the deep learning model.

3. The computer-implemented method of claim 1, wherein the splitting further comprises:
   responsive to determining that the deep learning model cannot be split into the plurality of slices by layers, splitting, by the one or more computer processors, the deep learning model into the plurality of slices based on a set of predetermined rules, wherein the set of predetermined rules split the deep learning model into a plurality of smallest parallelizable layers.

4. The computer-implemented method of claim 1, further comprising:
   encoding, by the one or more computer processors, features of the plurality of devices per time slice, wherein the features include at least one of, but are not limited to, central processing unit (CPU) capacity, graphical processing unit (GPU) capacity; and disk capacity, and further wherein the time slice is a predetermined period of time;
   predicting, by the one or more computer processors, the risk factor for each device of the plurality of devices, wherein the risk factor is predicted using a long short-term memory (LSTM) model;
   responsive to determining that the risk factor for any device of the plurality of devices exceeds a predetermined threshold, selecting, by the one or more computer processors, the top n devices of the plurality of devices, wherein n is a predetermined number, and further wherein the top n devices have a lowest risk factor;
   responsive to selecting the top n devices of the plurality of devices, creating, by the one or more computer processors, one or more new virtual models from the plurality of slices, wherein the one or more new virtual models are based on the device resources of the top n devices of the plurality of devices; and
   updating, by the one or more computer processors, the cache with the one or more new virtual models.

5. The computer-implemented method of claim 1, wherein the device monitor collects the device capabilities from the plurality of devices on a time schedule.

6. The computer-implemented method of claim 1, further comprising:
   monitoring, by the one or more computer processors, a health of each device of the plurality of devices;
   responsive to determining that the health of any device of the plurality of devices is below a predetermined threshold, marking, by the one or more computer devices, the any device as a failed device;
   removing, by the one or more computer processors, the failed device from the plurality of devices;
   creating, by the one or more computer processors, a new virtual model, wherein the new virtual model does not include the failed device;
   deploying, by the one or more computer processors, the new virtual model to the one or more devices of the plurality of devices; and
   updating, by the one or more computer processors, the cache with the new virtual model.

7. The computer-implemented method of claim 1, further comprising:
   creating, by the one or more computer processors, one or more virtual models from the plurality of slices, wherein the one or more virtual models are based on the device resources of the plurality of devices on which the one or more virtual models are to be deployed, and further wherein each virtual model of the plurality of virtual models contains each slice of the plurality of slices; and
   confirming, by the one or more computer processors, that the one or more virtual models match the deep learning model, wherein confirming that the one or more virtual models match the deep learning model is determined by one or more predetermined validation rules.

8. A computer program product comprising one or more computer readable storage media and program instructions stored on the one or more computer readable storage media, the program instructions including instructions to:
   split, by one or more computer processors, a deep learning model comprising a recurrent neural network (RNN) into a plurality of slices, wherein each of the slices comprises at least one of a plurality of layers comprising the deep learning model, wherein each of the slices requires a computing capacity, and wherein each of the slices records its back or forward slice to remember a last state of an input and to build up a double linked layer network;

collect, by a device monitor, a plurality of device resources of a plurality of devices;

monitor a risk factor of the plurality of devices based on the device resources;

select a plurality of top n devices from the devices, wherein the top n devices have a lowest risk factor;

distribute, by a virtual model cache, the slices to the top n devices based on the computing capacity required by the slices and the device resources of the top n devices; and run the deep learning model on the top n devices.

9. The computer program product of claim 8, wherein each slice of the plurality of slices comprises a different network layer of a plurality of different network layers of the deep learning model.

10. The computer program product of claim 8, wherein the instructions to split further comprise:

responsive to determining that the deep learning model cannot be split into the plurality of slices by layers, splitting, by the one or more computer processors, the deep learning model into the plurality of slices based on a set of predetermined rules, wherein the set of predetermined rules split the deep learning model into a plurality of smallest parallelizable layers.

11. The computer program product of claim 8, further comprising instructions to:

encode features of the plurality of devices per time slice, wherein the features include at least one of, but are not limited to, central processing unit (CPU) capacity, graphical processing unit (GPU) capacity; and disk capacity, and further wherein the time slice is a predetermined period of time;

predict the risk factor for each device of the plurality of devices, wherein the risk factor is predicted using a long short-term memory (LSTM) model;

responsive to determining that the risk factor for any device of the plurality of devices exceeds a predetermined threshold, select the top n devices of the plurality of devices, wherein n is a predetermined number, and further wherein the top n devices have a lowest risk factor;

responsive to selecting the top n devices of the plurality of devices, create one or more new virtual models from the plurality of slices, wherein the one or more new virtual models are based on the device resources of the top n devices of the plurality of devices; and update the cache with the one or more new virtual models.

12. The computer program product of claim 8, wherein the device monitor collects the device capabilities from the plurality of devices on a time schedule.

13. The computer program product of claim 8, further comprising instructions to:

monitor a health of each device of the plurality of devices;

responsive to determining that the health of any device of the plurality of devices is below a predetermined threshold, mark the any device as a failed device;

remove the failed device from the plurality of devices;

create a new virtual model, wherein the new virtual model does not include the failed device;

deploy the new virtual model to the one or more devices of the plurality of devices; and update the cache with the new virtual model.

14. The computer program product of claim 8, further comprising instructions to:

create, by the one or more computer processors, one or more virtual models from the plurality of slices, wherein the one or more virtual models are based on the device resources of the plurality of devices on which the one or more virtual models are to be deployed, and further wherein each virtual model of the plurality of virtual models contains each slice of the plurality of slices; and confirm that the one or more virtual models match the deep learning model, wherein confirming that the one or more virtual models match the deep learning model is determined by one or more predetermined validation rules.

15. A computer system comprising:

one or more computer processors;

one or more computer readable storage media; and program instructions stored on the one or more computer readable storage media for execution by at least one of the one or more computer processors, the stored program instructions including instructions to:

split, by the one or more computer processors, a deep learning model comprising a recurrent neural network (RNN) into a plurality of slices, wherein each of the slices comprises at least one of a plurality of layers comprising the deep learning model, wherein each of the slices requires a computing capacity, and wherein each of the slices records its back or forward slice to remember a last state of an input and to build up a double linked layer network;

collect, by a device monitor, a plurality of device resources of a plurality of devices;

monitor a risk factor of the plurality of devices based on the device resources;

select a plurality of top n devices from the devices, wherein the top n devices have a lowest risk factor;

distribute, by a virtual model cache, the slices to the top n devices based on the computing capacity required by the slices and the device resources of the top n devices; and run the deep learning model on the top n devices.

16. The computer system of claim 15, wherein each slice of the plurality of slices comprises a different network layer of a plurality of different network layers of the deep learning model.

17. The computer system of claim 15, wherein the instructions to split further comprise:

responsive to determining that the deep learning model cannot be split into the plurality of slices by layers, splitting, by the one or more computer processors, the deep learning model into the plurality of slices based on a set of predetermined rules, wherein the set of predetermined rules split the deep learning model into a plurality of smallest parallelizable layers.

18. The computer system of claim 15, further comprising instructions to:

encode features of the plurality of devices per time slice, wherein the features include at least one of, but are not limited to, central processing unit (CPU) capacity, graphical processing unit (GPU) capacity; and disk capacity, and further wherein the time slice is a predetermined period of time;

predict the risk factor for each device of the plurality of devices, wherein the risk factor is predicted using a long short-term memory (LSTM) model;

responsive to determining that the risk factor for any device of the plurality of devices exceeds a predetermined threshold, select the top n devices of the plurality of devices, wherein n is a predetermined number, and further wherein the top n devices have a lowest risk factor;

responsive to selecting the top n devices of the plurality of devices, create one or more new virtual models from the plurality of slices, wherein the one or more new virtual models are based on the device resources of the top n devices of the plurality of devices; and update the cache with the one or more new virtual models.

19. The computer system of claim 15, further comprising instructions to:

monitor a health of each device of the plurality of devices;

responsive to determining that the health of any device of the plurality of devices is below a predetermined threshold, mark the any device as a failed device;

remove the failed device from the plurality of devices;

create a new virtual model, wherein the new virtual model does not include the failed device;

deploy the new virtual model to the one or more devices of the plurality of devices; and update the cache with the new virtual model.

20. The computer system of claim 15, further comprising instructions to:

create, by the one or more computer processors, one or more virtual models from the plurality of slices, wherein the one or more virtual models are based on the device resources of the plurality of devices on which the one or more virtual models are to be deployed, and further wherein each virtual model of the plurality of virtual models contains each slice of the plurality of slices; and confirm that the one or more virtual models match the deep learning model, wherein confirming that the one or more virtual models match the deep learning model is determined by one or more predetermined validation rules.

* * * * *